(12) United States Patent
Kojima (10) Patent No.: US 7,717,509 B2
(45) Date of Patent: May 18, 2010

(54) VEHICLE SEAT APPARATUS

(75) Inventor: Yasuhiro Kojima, Kariya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 433 days.

(21) Appl. No.: 11/611,960

(22) Filed: Dec. 18, 2006

(65) Prior Publication Data

US 2007/0194613 A1    Aug. 23, 2007

(30) Foreign Application Priority Data

Dec. 27, 2005    (JP) ............................. 2005-374487

(51) Int. Cl.
*B60N 2/427* (2006.01)
(52) U.S. Cl. .............................. 297/216.2; 297/216.14; 297/344.15
(58) Field of Classification Search .............. 297/216.1, 297/216.13, 216.14, 216.16, 216.2, 344.15; 248/421, 429
See application file for complete search history.

(56) References Cited

U.S. PATENT DOCUMENTS

| | | | |
|---|---|---|---|
| 5,697,674 A * | 12/1997 | Aufrere et al. ......... | 297/344.15 |
| 5,709,364 A * | 1/1998 | Araki et al. ................. | 248/421 |
| 5,863,098 A * | 1/1999 | Kojima et al. .......... | 297/344.15 |
| 6,250,705 B1 * | 6/2001 | Zuch .......................... | 296/68.1 |
| 6,425,557 B1 * | 7/2002 | Becker et al. ................ | 248/157 |
| 6,502,798 B1 * | 1/2003 | Frohnhaus et al. .......... | 248/422 |
| 6,502,799 B2 * | 1/2003 | Lepaule ....................... | 248/423 |
| 6,902,234 B2 * | 6/2005 | Becker et al. ............. | 297/216.1 |
| 6,957,796 B2 * | 10/2005 | Hensley et al. .............. | 248/421 |
| 7,243,992 B2 * | 7/2007 | Canteleux et al. ......... | 297/216.1 |

FOREIGN PATENT DOCUMENTS

| | | |
|---|---|---|
| DE | 201 21 469 U1 | 1/2003 |
| JP | 2003-335162 | 11/2003 |

* cited by examiner

*Primary Examiner*—Peter R. Brown
(74) *Attorney, Agent, or Firm*—Oblon, Spivak, McClelland, Maier & Neustadt, L.L.P.

(57) ABSTRACT

A vehicle seat apparatus includes a pair of vehicle-width spaced lower arms attached to a seat cushion, each of the lower arms having a rear portion; a connecting member fixed to the rear portion of each of the lower arms; a pair of vehicle-width spaced upper arms attached to a seat back, each of the upper arms being pivoted by a rotational shaft to the rear portion of the corresponding lower arm to rotate relative thereto; a reclining apparatus provided at one of the connecting member and serving for restricting and allowing the upper arms to rotate; and a load receiving portion provided at one of the lower arms for receiving a downward load, when the downward load is transmitted from the connecting member to the rear portion of one of the lower arms, by being brought into engagement with at least one of the upper arm, the reclining apparatus, and the connecting member.

8 Claims, 5 Drawing Sheets

VEHICLE SEAT APPARATUS

CROSS REFERENCE TO RELATED APPLICATIONS

This application is based on and claims priority under 35 U.S.C §119 with respect to Japanese Patent Application 2005-374487, filed on Dec. 27, 2005, the entire content of which is incorporated herein by reference.

FIELD OF THE INVENTION

The present invention relates to a vehicle seat apparatus which prevents an excessive load to a lower arm when the vehicle is impacted from the rear end by another vehicle or object.

BACKGROUND

Generally, a conventional vehicle seat apparatus includes a lower rail and an upper rail. The lower arm is for fixing on a floor of a vehicle and is attached to a seat cushion for supporting the same. The upper arm, which supports a seat back, is pivoted by a hinge pin to a rear portion of the lower arm to rotate about the pin. A reclining apparatus is provided between the lower arm and the upper arm for restricting and allowing the upper arm to rotate.

While a passenger sits on the above-described vehicle seat apparatus, if the vehicle is impacted from the rear by another vehicle or object (hereinafter, this is referred to as a rear-end collision), the resulting rear-end collision impact load is transmitted to the seat back to receive. The impact load on the seat back is in the direction of an arrow F1, thereby causing the lower arm generate a bending moment in the direction of an arrow F2 in FIG. 1.

In order to absorb impact energy from the rear-end collision, for example, JP-2003-335162-A illustrates a vehicle seat in which a rear portion of a lower arm positioned beneath a reclining apparatus is provided with a frangible portion which is in the form of a folded offset configuration for being subject to deform upon receipt of force. The frangible portion when being deformed provides an advantage to absorb an amount of energy when the vehicle is rear-ended. However, the deformation of the frangible portion may cause the seat back to rotate or tilt excessively.

In order to avoid the excessive tilt of the seat back upon rear-end collision, one proposal is to make the lower arm more rigid for preventing an easy deformation thereof upon receipt of rear-end collision impact transmitted to the lower arm via the reclining apparatus. For enhancing the rigidity or strength of the lower arm, say, the lower arm has to be of higher section modules by reducing, bead-forming, or flange-forming, resulting in that the lower arm becomes too complex in shape to form, which leads to increase the production cost.

The present invention has been made in view of the above circumstances, and provides a vehicle seat apparatus in which the load exerted by the force applied at the rear-end collision is shared by the entire frame of the seat apparatus to prevent the excessive load from being exerted on the lower arm.

SUMMARY OF THE INVENTION

An aspect of the present invention which provides a vehicle seat apparatus including:

a pair of vehicle-width spaced lower arms attached to a seat cushion, each of the lower arms having a rear portion;

a connecting member fixed to the rear portion of each of the lower arms;

a pair of vehicle-width spaced upper arms attached to a seat back, each of the upper arms being pivoted by a rotational shaft to the rear portion of the corresponding lower arm to rotate relative thereto;

a reclining apparatus provided at one of the connecting member and serving for restricting and allowing the upper arms to rotate; and a load receiving portion provided at one of the lower arms for receiving a downward load, when the downward load is transmitted from the connecting member to the rear portion of one of the lower arms, by being brought into engagement with at least one of the upper arm, the reclining apparatus, and the connecting member.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

First Embodiment

Figure 1:
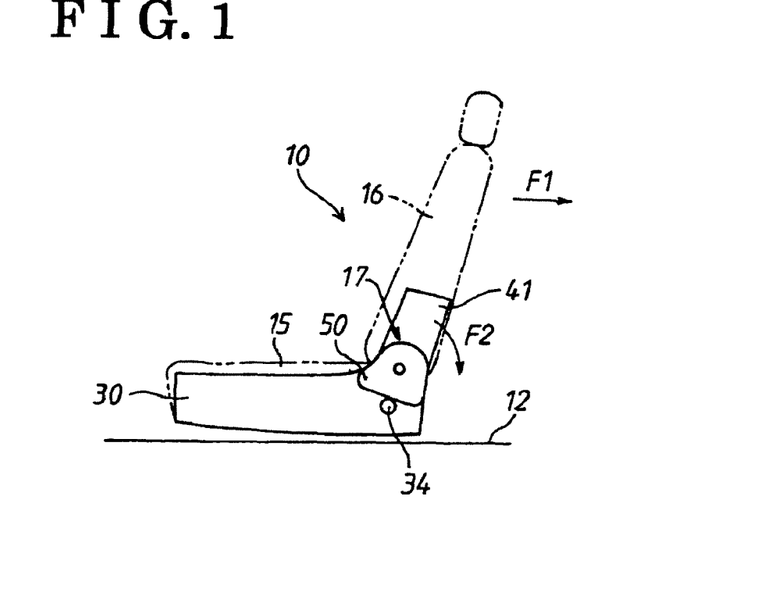
FIG. 1 illustrates a general structure of a vehicle seat apparatus.
Figure 2:
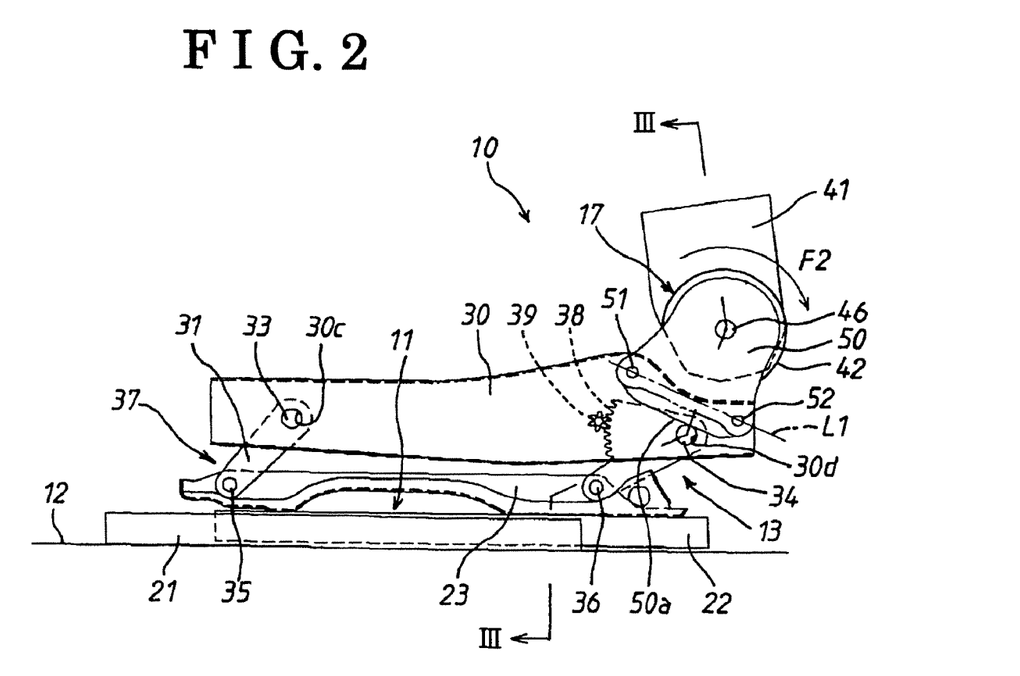
FIG. 2 is a side view of a vehicle seat apparatus according to a first embodiment of the invention.

A first embodiment of the present invention will be described below with reference to the attached drawings. In FIG. 1 and FIG. 2, a vehicle seat apparatus 10, which is movable in the vertical direction by a seat lifting apparatus 13, is mounted on a vehicle floor 12 so as to be sidable in a vehicle-lengthwise direction or forward and backward direction (right-left direction or horizontal direction in FIG. 2) of a vehicle by a seat slide adjusting apparatus 11. The vehicle seat apparatus 10 includes a seat cushion 15 as a seating surface and a seat back 16 as a passenger's back support surface. The seat back 16 is attached to a rear portion of the seat cushion 15 via a seat reclining apparatus 17 which restricts/allows the seat back 16 to rotate in such a manner that the seat back 16 is capable of rotate relative to the vehicle-lengthwise direction and can stop at a desired angular position.

Figure 3:
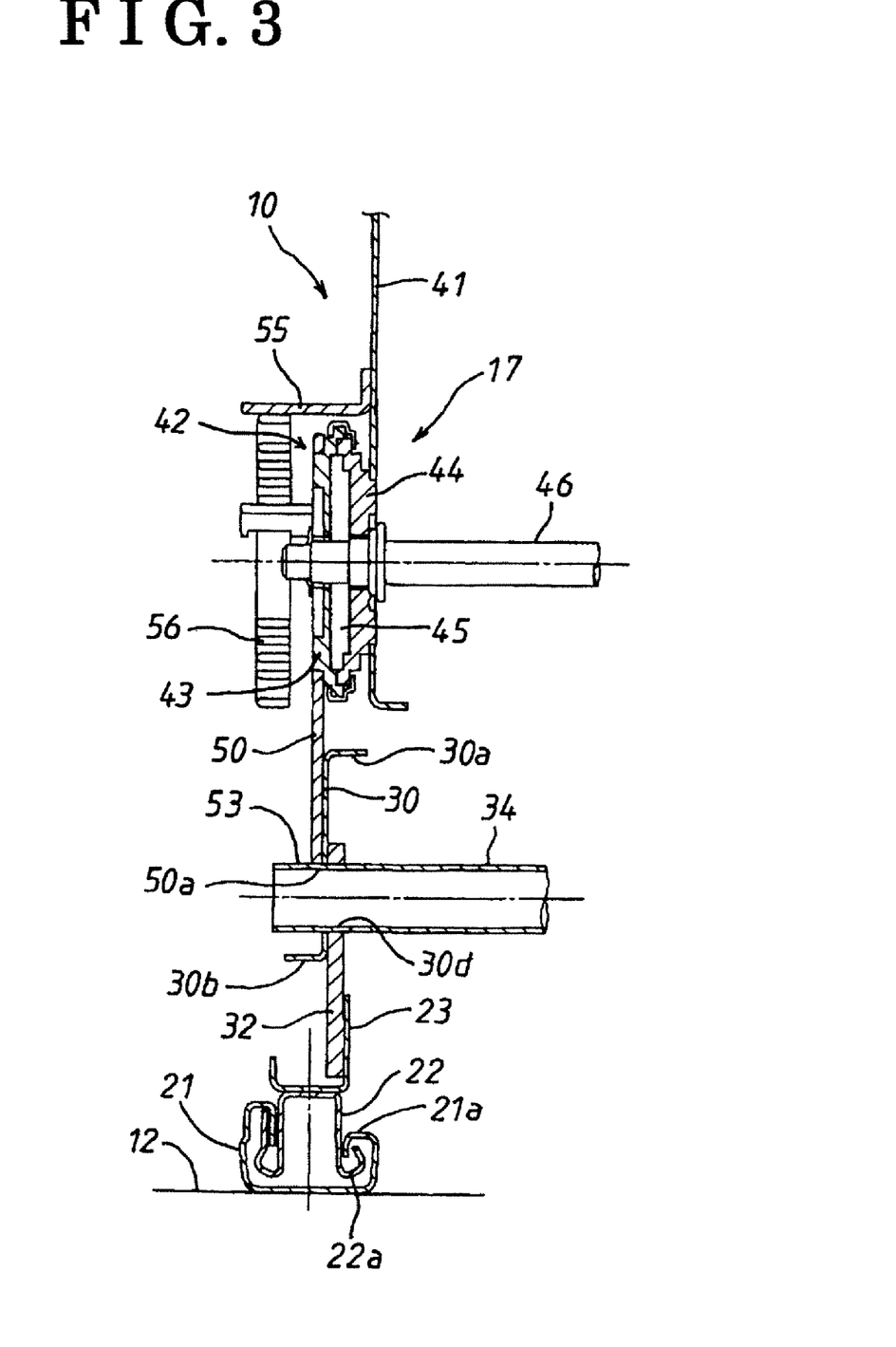
FIG. 3 is a cross sectional view of the vehicle seat apparatus taken along a line III-III of FIG. 2.
Figure 4:
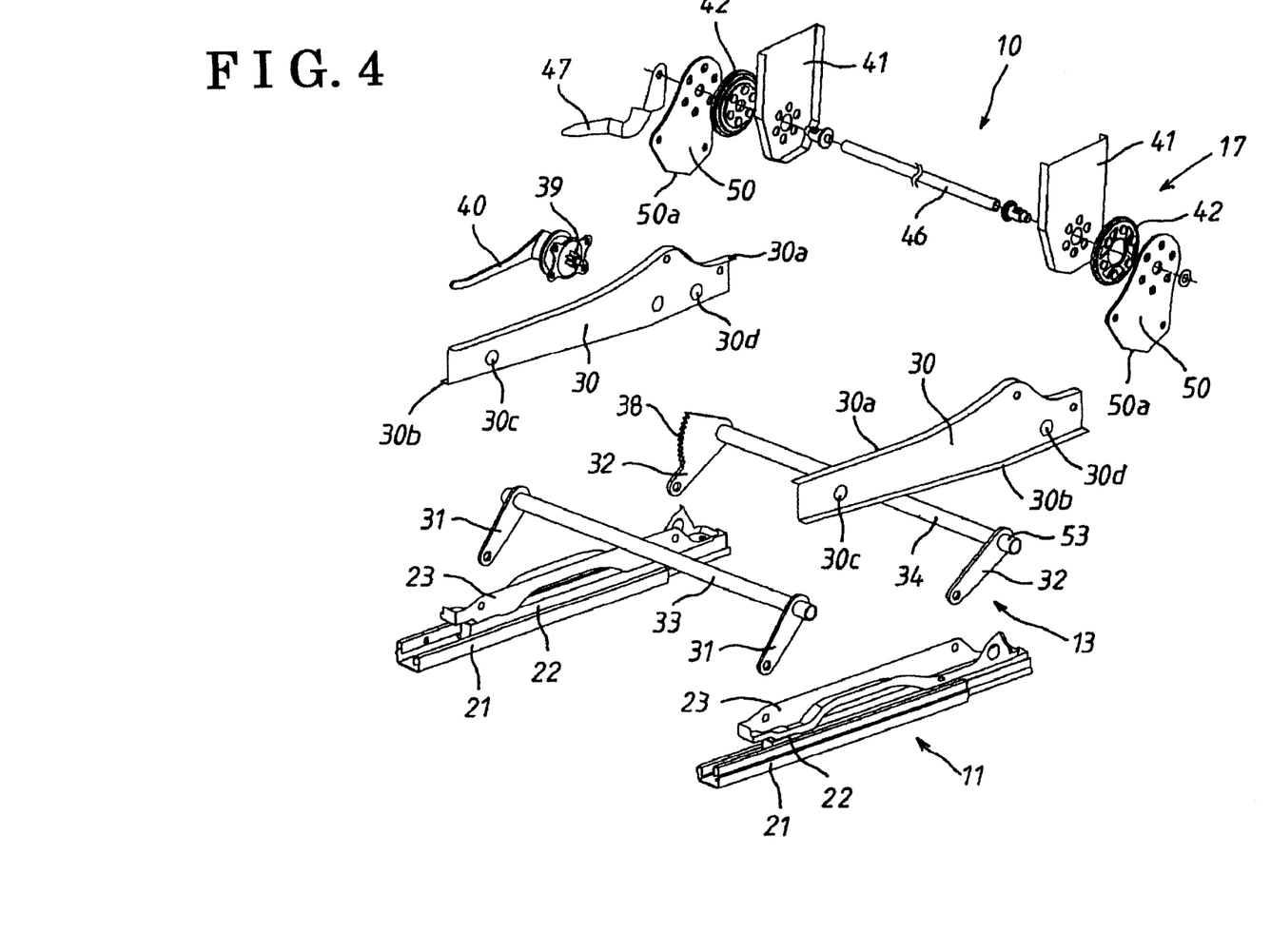
FIG. 4 is an exploded perspective view of the vehicle seat apparatus according to the first embodiment.

As illustrated in FIG. 4, the seat slide adjusting apparatus 11 includes a pair of vehicle-width spaced lower rails 21 and a pair of vehicle-width spaced upper rails 22. The lower rails 21 are fixed to the vehicle floor 12. Each of the lower rails 21 is formed into an elongated shape extending in the forward and backward direction of the vehicle (the forward and backward direction of the seat). As illustrated in FIG. 3, each of the lower rails 21 has an approximately U-shaped cross section and a pair of engaging flanges 21a are formed on both ends of the cross section. Each of the upper rails 22 is formed in an elongated shape extending in the forward and backward direction of the vehicle and has an approximately inverted T-shaped cross section. A pair of engaging flanges 22a are formed on both ends of the cross section, respectively. The respective engaging flanges 22a of the upper rail 22 are interlocked with the respective engaging flange 21a so as to be slidable in the forward and backward direction of the vehicle. Thus, the vehicle seat apparatus 10 is mounted on the vehicle floor 12 for sliding in the forward and backward direction of the vehicle and is held at a desired position by manipulating a locking mechanism (not shown). A connecting flame 23 having a J-shaped cross section is fixed on each of the upper rails 22 by welding or other techniques.

As illustrated in FIG. 4, the seat lifting apparatus 13 includes a pair of front link members 31 and a pair of rear link members 32. The pair of the front link members 31 and the pair of the rear link members 32 link the pair of the lower arms 30 each fixed to left (outer side) and right (inner side) portions of the seat cushion 15 to the connecting frames 23 fixed on the pair of upper rails 22. As illustrated in FIG. 3, an upper flange portion 30a is formed on an upper end of each lower arm 30 with each upper flange portion 30a bent inwardly. A lower flange portion 30b is formed on a lower end of each lower arm 30 with each lower flange portions 30b bent outwardly. The respective upper and lower flange portions 30a and 30b are not connected to each other, and are formed in simple shapes which open in the forward and backward direction of the vehicle to improve formability.

Upper end sides of the left and right front link members 31 are connected to each other by a pipe-shaped torque rod 33 which rotatably penetrates through front through holes 30C. Upper end sides of the left and right rear link members 32 are connected to each other by a pipe-shaped torque rod 34 which rotatably penetrates through rear through holes 30D. The front through hole 30C is formed in a front portion of the respective lower arms 30 and the rear through hole 30D is formed in a rear portion of the respective lower arms 30. Each of the lower end sides of the left and right front link members 31 is rotatably supported by each connecting frame 23 fixed on the upper rail via a hinge pin 35. Each of the lower end sides of the left and right rear link members 32 is rotatably supported by each connecting frame 23 positioned on the upper rail 22 via a hinge pin 36. The front link members 31, the rear link members 32, the lower arms 30, and the connecting frames 23 fixed on the upper rails 22 structure a parallel link mechanism 37 (refer to FIG. 2), and the lower arms 30 move parallel in a vertical direction by rotation of the front link members 31 and the rear link members 32.

The torque rod 34 links the left rear link member 32 to the right rear link member 32 and transmits a torque from one of the rear link members 32 to the other one of the rear link members 32. As illustrated in FIG. 3, both end portions of the torque rod 34 project outwardly from the lower arms 30 and each projected portion forms a load receiving portion 53 respectively. Each load receiving portion 53 contacts with a connecting member 50 which will be described below.

Furthermore, a sector gear 38 is integrally formed with either one of the left and right rear link members 32, and the sector gear 38 has a center which is identical to a rotational center (torque rod 34) of the rear link member 32. A pinion gear 39 is rotatably supported by the lower arm 30 and is meshed with the sector gear 38. An operation handle 40 (refer to FIG. 4) is connected to the pinion gear 39. In response to rotation of the pinion gear 39 which is operated by the operational handle 40, the rear link member 32 is rotated about the hinge pin 36 via the sector gear 38. In response to rotation of the rear link member 32, the tilt angles of the front link members 31 and the rear link members 32 are adjusted by the parallel link mechanism 37 to adjust the position of the lower arms 30 to an appropriate height.

As illustrated in FIG. 4, the reclining apparatus 17 is provided with a pair of reclining adjusters 42 disposed on both sides of a pair of the upper arms 41. The upper arms 41 are attached to the left and the right portions of the seat back 16 respectively. As illustrated in FIG. 3, each reclining adjuster 42 is formed by a disc shaped lower plate 43 and a disc shaped upper plate 44, and the upper plate 44 is fitted into the lower plate 43 so as to be rotatable relative thereto. The lower plate 43 is connected to the lower arm 30, which is attached to the seat cushion 15, via the connecting member 50 which will be described below. The upper plate 44 is fixed to the upper arm 41 by welding or other techniques.

An internal space 45 is defined between the lower plate 43 and the upper plate 44 and a rotational shaft 46 is penetrated into the lower plate 43 and the upper plate 44 across the internal space 45. An operation lever 47 (refer to FIG. 4) is attached to an end of the rotation shaft 46 and the operation lever 47 is used for adjusting an angle of seat back 16 relative to the seat cushion 15. A lock mechanism is disposed in the internal space 45 to lock the seat back 16 at an adjusted angle position. The lock mechanism is a known technique, for example, the mechanism is disclosed in JP 2003-9978A. Therefore, the detail of the mechanism is omitted. The mechanism is typically constructed by a pawl, a pawl plate, and a cam. The pawl has engaging teeth which engageably and disengageably mesh with internal teeth formed in the lower plate 43. The pawl plate is rotated via the rotation shaft 46 by the operation of the operation lever 47, and the cam allows the pawl to engage and disengage with the internal teeth in response to rotation of the pawl plate.

The reclining apparatus 17, which is configured as described above, restricts/allows rotation of the upper arm 41 (seat back 16) relative to the lower arm 30 (seat cushion 15) and holds the upper arm 41 (seat back 16) at the adjusted angle position.

Upper portions of the pair of plate shaped connecting members 50 are fastened to the lower plates 43 positioned on the pair of the reclining adjusters 42 by bolts, rivets or other fastening means and lower potions of the pair of connecting members 50 are fastened to the outsides of the rear portions of the lower arms 30 by bolts, rivets, and other fastening means at two points 51 and 52. The two points 51 and 52 are spaced in the forward and backward direction of the vehicle and the rear fastening point 52 is disposed at the position which is slightly lower compared to the front fastening point 51. A line L1 connecting the two points 51 and 52 is arranged so as to be inclined downwardly in a direction of the rear of the vehicle. Contact portions 50a are formed on lower ends of the pair of the connecting members 50 and each contact portion 50a is in contact with the load receiving portion 53 of the torque rod 34 connecting the pair of the rear link members 32 to each other. The contact portion 50a is configured so as to be in approximately parallel with the line L1. The load receiving portion 53 of the torque rod 34 has a function of receiving the load transmitted to the lower arm 30 by contacting the contact portion 50a of the connecting member 50.

It would be practically difficult to configure the torque rod 34 and the contact portion 50a of the connecting member 50 so as to constantly contact each other due to size tolerance of each component, assembly errors and other errors. For the reason, the torque rod 34 and the contact portion of the connecting member 50 are designed to have a small clearance therebetween in consideration of the size tolerance of each component, assembly errors and other errors. However, the clearance caused by the size tolerance and the assembly errors and other errors is disregarded, and the torque rod 34 and the contact portion 50a of the connecting member 50 are deemed to apparently contact each other on a constant basis.

Meanwhile, the torque rod 34 and the contact portion 50a of the connecting member 50 may be disposed so as to have a small or an appropriate clearance. In that case, the lower arm is slightly deformed and then the toque rod 34 comes in contact with the contact portion 50a of the connecting member 50. Hence, an impact absorption effect obtained by the deformation of the lower arm can be expected.

As illustrated in FIG. 3, a return spring 56 is engaged with a bracket 55 fixed to the upper arm 41 at one end and the return spring 56 is connected to the lower arm 30 side at the other end. The return spring 56 constantly exerts the biasing force on the upper arm 41 in the direction which the seat back 16 leans forward. Therefore, when the lock of the lock mechanism in the reclining adjuster 42 is released by the operation of the operation lever 47, the seat back 16 is returned to the forward position by the biasing force of the return spring 56.

Next, the operation will be described in the aforementioned first embodiment. When the vehicle is impacted from the rear (impacted by another vehicle or object from the rear direction) with the passenger sitting on the vehicle 10, the load caused by the rear-end collision is applied to the seat back 16 and the load is exerted on the seat back 16 in the direction of the arrow F1 of FIG. 1. The load is transmitted to the rear portion of the lower arm 30 via the connecting member 50 which connects the reclining apparatus 17 with the lower arm 30. Thus, a bending moment acts on the connecting member 50 in the direction of the arrow F2 of FIG. 2 (clockwise) with the front fastening point 51 served as a supporting point and a force acts on to deform the rear portion (near the fastening point 52) of the lower arm 30.

However, the contact portion 50a of the connecting member 50 comes in contact with the load receiving portion 53 of the torque rod 34 by the bending moment which acts on the connecting member 50 with the front fastening point 51 serving as the supporting point. The load is transmitted directly from the connecting member 50 to the frame portion (the seat lifting apparatus and/or the seat slide adjusting apparatus) of the seat apparatus via the torque rod 34. Therefore, the load is shared by the entire frame of the seat apparatus and the excessive load is not applied to the rear portion of the lower arm 30. Hence, it is not necessary to form the lower arm 30 in a robust structure and possible to modify a flange shape of the lower arm 30 to an open shape, which is easy to form. As a result, the lower arm 30 can be formed at low cost.

According to the first embodiment described above, when the load caused by the rear-end collision is transmitted to the lower arm 30 via the connecting member 50, the connecting member 50 comes in contact with the load receiving portion 53 provided at the lower arm 30 side and the load can be directly received by the load receiving portion 53. Therefore, the excessive load is not exerted on the rear portion of the lower arm 30 and it is not necessary to strengthen the lower arm 30 itself. Thus, a complicated forming process for enhancing the strength of the lower arm 30 is not necessary and the cost of the lower arm 30 is reduced which lead to the reduction of the cost of the vehicle seat apparatus. Moreover, the excessive tilt of the seat, which is observed in the conventional vehicle seat apparatus, is unlikely to occur.

In addition, the torque rod 34, which structures the seat lifting apparatus 13 provided at the vehicle floor 12, is used as the load receiving portion 53. Therefore, the load transmitted to the lower arm 30 by the rear-end collision can be received by the component (34), which is currently used for the seat lifting apparatus, and the number of the components is barely increased.

When the connecting member 50 is constantly in contact with the load receiving portion 53, even if the load caused by the rear-end collision is transmitted to the lower arm 30, the load can be directly received by the load receiving portion 53 with little deformation of the rear portion of the lower arm 30. Further, when the small or the appropriate clearance is defined between the connecting member 50 and the load receiving portion 53, and the load is transmitted to the lower arm 30 because of the rear-end collision, the load can be received by the load receiving portion 53 after the rear portion of the lower arm 30 is slightly deformed. Therefore, in that case, a collision energy relaxation effect can be expected by the deformation of the lower arm 30.

In the first embodiment described above, the contact portion 50a is formed on the lower end of the connecting member 50 to contact with the load receiving portion 53 formed by the torque rod 34. However, a hole may be provided at the lower potion of the connecting member 50 to penetrate through the load receiving portion 53, and an upper portion of the hole may be used as a contact portion.

In the first embodiment described above, the connecting member 50 is designed to be in contacted with the load receiving portion 53 (torque rod 34). However, it is possible to configure in a way that the upper arm 41 or the reclining apparatus 17 is in contact with the load receiving portion 53.

Second Embodiment

Figure 5:
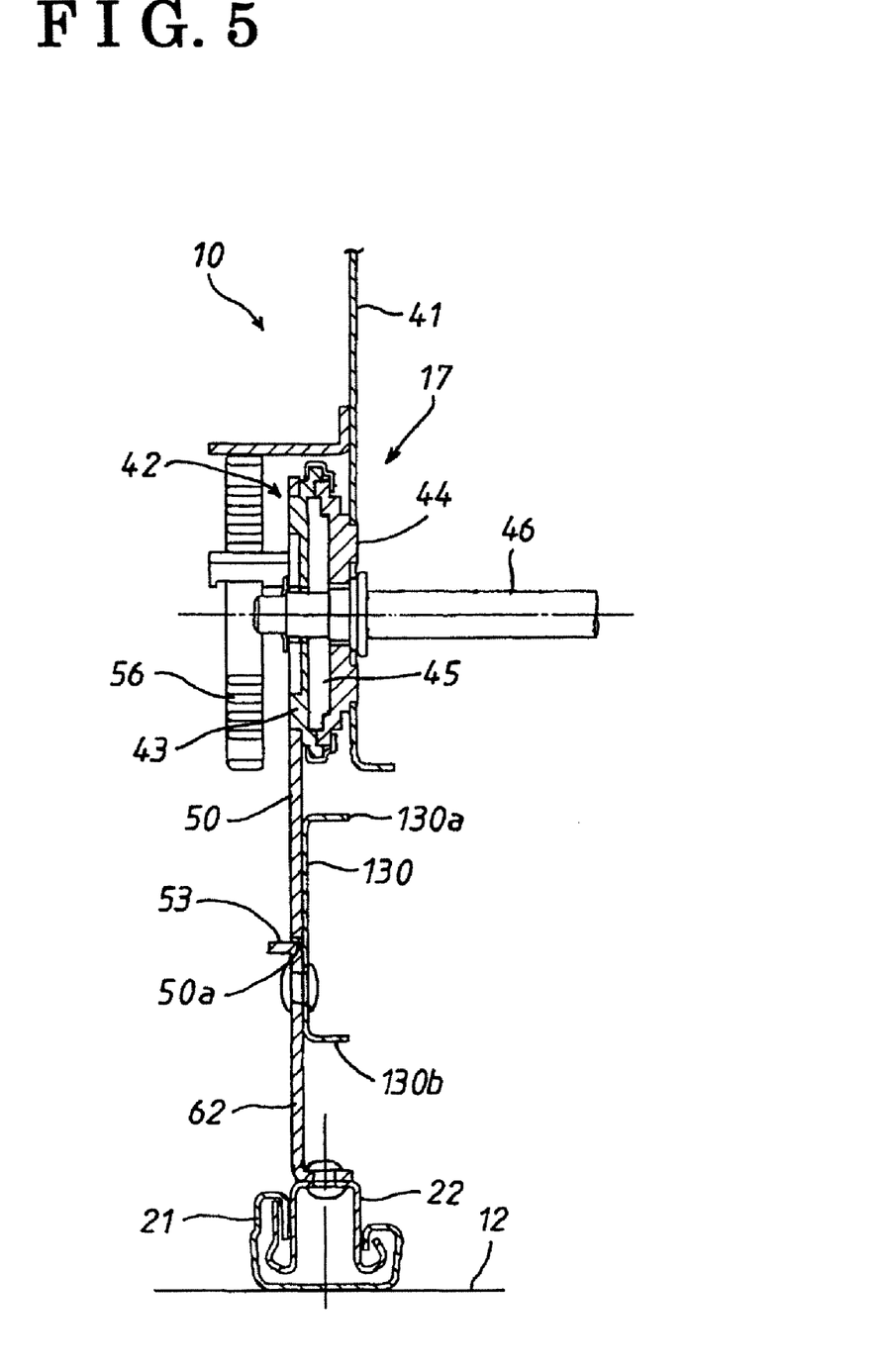
FIG. 5 is an cross sectional view of a vehicle seat apparatus according to a second embodiment of the invention.
Figure 6:
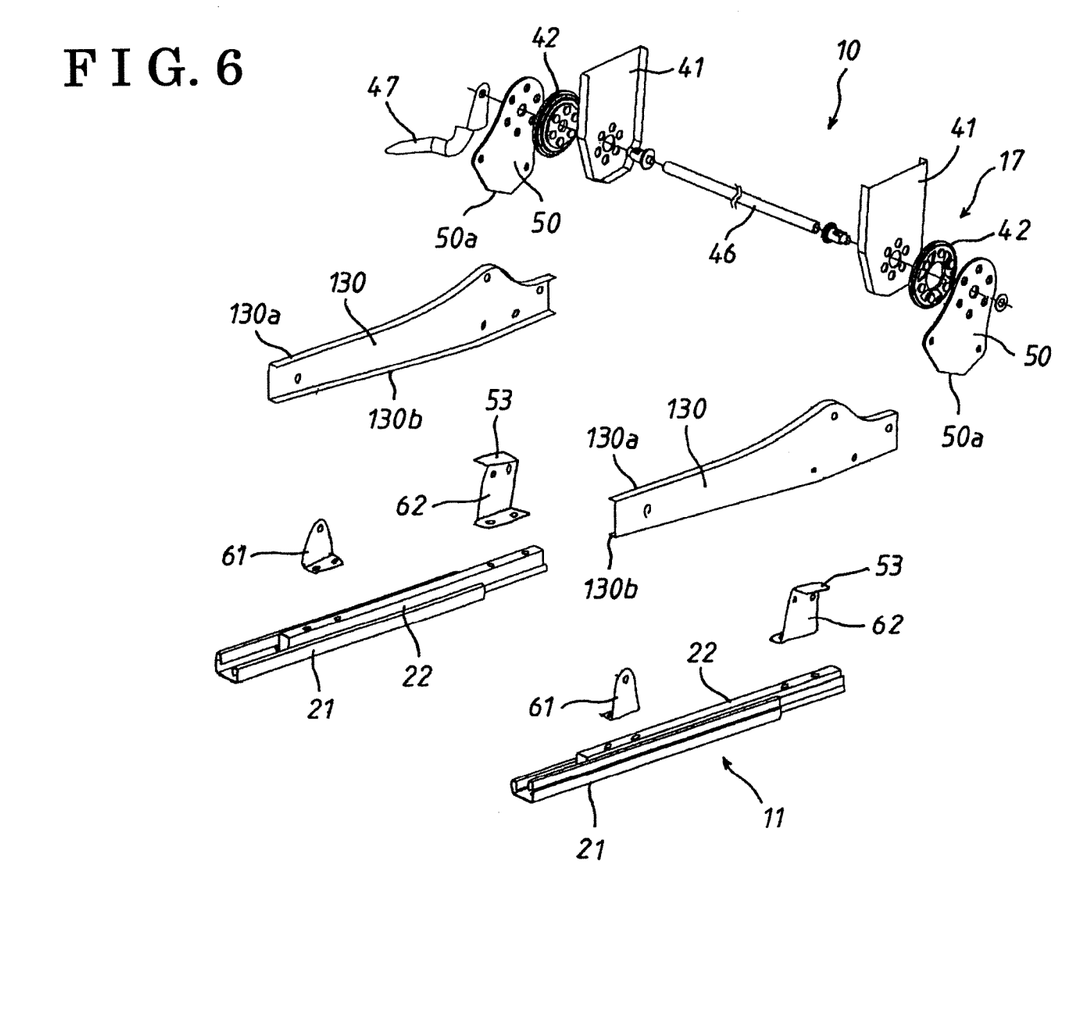
FIG. 6 is an exploded perspective view of the vehicle seat apparatus according to the second embodiment.

FIG. 5 and FIG. 6 illustrate the second embodiment of the invention, the invention is applied to the vehicle seat 10 which does not have the seat lifting apparatus 13 described in the first embodiment. The other configuration is identical to that of the first embodiment. Thus, the identical numbers are assigned to the unchanged components, and the overlapped description is omitted.

In the vehicle seat apparatus 10 according to the second embodiment, the lower rails 21 of the seat slide adjusting apparatus 11 are fixed to the vehicle floor 12, the upper rails 22 are slidably engaged with the lower rails 21 in a forward and backward direction of a vehicle (in a forward and backward direction of the seat).

A pair of fastener members 61 and a pair of fastener members 62 are spaced in the forward and backward direction of the vehicle, and a lower portion of each fastener member 61 and 62 is fastened to each upper rail 22 with bolts, rivets or other fastening means. The upper portions of the fastener members 61 are fastened to the front portions of outer side surfaces of the left and right lower arms 130 and the upper portions of the fastener members 62 are fastened to the rear portions of the pair of the left and right lower arms 130 with bolts, rivets or other fastening means. The upper portion of each rear fastener member 62 is bent outwardly in a lateral direction to structure the load receiving portion 53 being in contact with the contact portion 50a of the connecting member 50. The connecting member 50 links the reclining apparatus 17 to the lower arm 130.

In the second embodiment, an upper flange portion 130a and a lower flange portion 130b are formed on upper and lower end portions of the lower arm 130 respectively. Each upper flange portion 130a and each lower flange portion 130b are bent inwardly. The upper flange portion 130a and lower flange portions 130b are in common with the lower arm 30 described in the first embodiment in that the upper flange portion 130a and the lower flange portion 130b are not connecting to each other and are formed in simple shapes which open in the forward and backward direction of the vehicle.

In the second embodiment described above, in the similar way as the aforementioned first embodiment, when the load caused by the rear-end collision is applied to the seat back 16, the load is transmitted to the rear portion of the lower arm 130 via the connecting member 50 which connects the reclining apparatus 17 with the lower arm 130. Consequently, the contact portion 50a of the connecting portion 50 comes in contact with the load receiving portion 53 of the rear fastener member 62 fastened to a rear portion of the lower arm 130, and the load is transmitted directly to the frame portion of the seat apparatus from the connecting member 50 via the fastener member 62. Therefore, the load can be shared by the entire frame of the seat apparatus and the excessive load is not applied to the rear portion of the lower arm 130. Accordingly, the lower arm is not necessary to be formed in a robust structure. For the reason, the flanges of the lower arm 130 can be formed in opening shapes which are easy to form and the lower arm 130 can be formed at low cost.

According to the second embodiment, when the load caused by the rear-end collision is transmitted to the lower arm 130 via the connecting member 50, the load can be directly received by the load receiving portion 53 formed on the fastener member 62 fastening the rear portion of the lower arm 130 and the upper rail 22 of the seat slide adjusting apparatus 11. Thus, the invention can be readily applied to the vehicle seat apparatus with a simple configuration where the load receiving portion 53 is formed on the fastener member 62.

According to the second embodiment described above, in the vehicle seat apparatus 10 which does not include the seat lifting apparatus, the load receiving portion 53 is formed on the fastener member 62 fastening the lower arm 130 with the upper rail 22. The portion where the load receiving portion 53 is formed is not limited to the fastener member 62, and the load receiving portion 53 may be provided at other members fastening the lower arm 130 with the vehicle floor 12.

According to the invention, the vehicle seat apparatus has the connecting member which connects the rear portion of the lower arm with the reclining apparatus and the load receiving portion which receives the load by contacting with one of the upper arm, the reclining apparatus, and the connecting member when the downward load is transmitted to the rear portion of the lower arm from the connecting member. Therefore, even if the load caused by the rear-end collision is transmitted to the lower arm, the load can be received by the load receiving portion being in contact with one of the upper arm, the reclining apparatus, and the connecting member, and the excessive load is not exerted on the rear portion of the lower arm. Thus, it is not necessary to enhance strength of the lower arm, and the shape of the lower arm can be simple which is easy to form, resulting the cost reduction of the lower and thus the vehicle seat apparatus.

Further, the seat lifting apparatus is provided at the vehicle floor to move the seat cushion up and down, and the seat lifting apparatus includes link members provided at the left and right lower arms and a torque rod transmitting the torque from one of the link members to the other one of the link members. The load receiving portion is formed by the torque rod. Thus, the load transmitted to the lower arm because of the rear-end collision can be received by using the component, which is currently used for the seat lifting apparatus, and it is possible to prevent the excessive load from being exerted on the rear portion of the lower arm with a simple configuration.

Still further, the load receiving portion is provided at the fastener member fastening the lower arm with the vehicle floor side. Thus, the invention is readily applied to the vehicle seat apparatus which does not have the seat lifting apparatus with a simple configuration which the load receiving portion is provided at the fastener member.

Still further, the receiving portion is provided at the fastener member fastening the upper rail of the seat slide adjuster, which is provided at the vehicle floor side, with the lower arm. Hence, it is possible to prevent the excessive load from being exerted on the rear portion of the lower arm in the vehicle seat apparatus which does not have the seat lifting apparatus without increasing the number of the components.

Still further, the fastener member is constantly in contact with the load receiving portion. Thus, the load transmitted because of the rear-end collision can directly received by the load receiving portion with little deformation of the rear portion of the lower arm. For the reason, it is not necessary to enhance the strength of the lower arm.

The principles, of the preferred embodiments and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

What is claimed is:

1. A vehicle seat apparatus comprising:
   a pair of vehicle-width spaced lower arms attached to a seat cushion, each of the lower arms having a rear portion;
   a connecting member having an upper end portion and a lower end portion, the lower end portion of the connecting member being connected to the rear portions of the lower arms respectively;
   a pair of vehicle-width spaced upper arms attached to a seat back;
   a reclining apparatus provided at the upper end portion of the connecting member to allow the upper arms to rotate relative to the lower arms, respectively; and
   a load receiving portion positioned below the connecting member to engage with at least one of the upper arms, the reclining apparatus, and the connecting member upon receipt of a downward load that is transmitted from the connecting member to the rear portion of one of the lower arms in case of a rear-end collision.

2. A vehicle seat apparatus according to claim 1, wherein the connecting member is flexible when receiving the load.

3. A vehicle seat apparatus according to claim 1 further comprising a seat lifting apparatus for moving the seat cushion vertically, the seat lifting apparatus including a pair of vehicle-width spaced link members, each of the link members being pivoted at both ends thereof to a corresponding upper rail and the seat cushion, respectively, a torque rod connected between the pair of link members for transmitting a torque from one of the link members to the other of the link members, the torque rod acting as the load receiving portion.

4. A vehicle seat apparatus according to claim 3, wherein the torque rod is in the form of a hollow tube.

5. A vehicle seat apparatus according to claim 1, wherein the load receiving portion is a fastener member connecting one of the lower arms and a portion of a vehicle floor.

6. A vehicle seat apparatus comprising:
   first and second lower arms spaced-apart in a vehicle-width direction and attached to a seat cushion, each of the first and second lower arms having a rear portion;

first and second upper arms spaced-apart in the vehicle-width direction and attached to a seat back;

first and second reclining apparatuses spaced-apart in the vehicle-width direction and provided to the first and second upper arms, respectively;

a first connecting member having a lower portion and an upper portion, the lower portion of the first connecting member being connected to the first lower arm, the upper portion of the first connecting member being connected to the first reclining apparatus such that the first reclining apparatus allows the first upper arm to rotate relative to the first lower arm;

a second connecting member having a lower portion and an upper portion, the lower portion of the second connecting member being connected to the second lower arm, the upper portion of the second connecting member being connected to the second reclining apparatus such that the second reclining apparatus allows the second upper arm to rotate relative to the second lower arm; and first and second load receiving portions positioned below the first and second connecting members to associate with the first and second lower arms, respectively, and to engage with the first and second connecting members, respectively, upon receipt of a downward load that is transmitted from the first and second connecting members to the rear portions of the first and second lower arms, respectively, in case of a rear-end collision.

7. A vehicle seat apparatus according to claim 6, wherein each of the first and second connecting members is flexible when receiving the load.

8. A vehicle seat apparatus according to claim 6 further comprising a seat lifting apparatus for moving the seat cushion vertically, the seat lifting apparatus including:

first and second link members which are spaced-apart in the vehicle-width direction, the first link member being provided between the first upper rail and the first upper arm, the second link member being provided between the second upper rail and the second upper arm; and a torque rod connected between the first and second link members to transmit a torque from one of the link members to the other of the link members, the torque rod acting as the load receiving portion.

* * * * *